United States Patent
Rose et al.

(10) Patent No.: US 6,667,355 B2
(45) Date of Patent: Dec. 23, 2003

(54) HIGHER ALKYLATED TRIARYL PHOSPHATE ESTER FLAME RETARDANTS

(75) Inventors: Richard S. Rose, West Lafayette, IN (US); David L. Buszard, Cheshire (GB); Matthew D. Phillips, Camden, IN (US); Frank J. Liu, West Lafayette, IN (US)

(73) Assignee: PABU Services, Inc., Wilmington, DE (US)

( * ) Notice: Subject to any disclaimer, the term of this patent is extended or adjusted under 35 U.S.C. 154(b) by 73 days.

(21) Appl. No.: 09/943,635

(22) Filed: Aug. 30, 2001

(65) Prior Publication Data

US 2003/0078325 A1 Apr. 24, 2003

(51) Int. Cl.⁷ .............. C08K 5/53; C08K 5/52; C08G 18/10
(52) U.S. Cl. .......... 524/130; 524/141; 524/143; 521/107; 528/65; 528/72; 252/609
(58) Field of Search .............. 521/107; 524/130, 524/141, 143; 528/65, 72; 252/609

(56) References Cited

U.S. PATENT DOCUMENTS

| 4,565,833 A | 1/1986 | Buszard et al. |
| 4,587,273 A | 5/1986 | Shimomura |
| 4,746,682 A | 5/1988 | Green |

FOREIGN PATENT DOCUMENTS

| EP | 0285138 A2 | 10/1988 |
| JP | 60123539 | 2/1985 |

OTHER PUBLICATIONS

Phosphorus Chemicals Brochure, *Flame Retardant Plasticizers, Additives & Modifiers,* AKZO–Nobel Funtional Chemicals Bulletin 99–94, 1999).

Primary Examiner—Kriellion A. Sanders
(74) Attorney, Agent, or Firm—Baker & Daniels

(57) ABSTRACT

Flame retardants for polymer compositions which are mixtures including triaryl phosphate esters represented by the following formula:

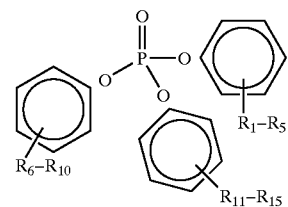

where $R_1$–$R_{15}$ can independently be located in the ortho, meta or para positions on their respective phenol rings and are, independently, H or branched or linear alkyl groups having 3 to 11 carbon atoms and the mole ratio of the alkylate to phenol in the mixtures is at least about 0.77, preferably greater than about 0.81, and most preferably greater than about 0.85. The higher alkylated mixtures of triaryl phosphate esters can be incorporated into polymer compositions alone or in combination with other flame retardants.

28 Claims, No Drawings

HIGHER ALKYLATED TRIARYL PHOSPHATE ESTER FLAME RETARDANTS

TECHNICAL FIELD

The present invention relates to alkylated triaryl phosphate ester flame retardants. More specifically, the present invention relates to the use of higher alkylated triaryl phosphate ester flame retardants in polyurethane compositions and to a process for imparting flame retardancy to a polyurethane by incorporating such higher alkylated triaryl phosphate esters therein.

BACKGROUND ART

The combination of abundant carbon-hydrogen bonds, large surface area, and open cell structure make flexible polyurethane foams extremely susceptible to combustion. Accordingly, flame retardant additives are often used to reduce the risk and severity of flexible polyurethane foam combustion.

The greatest use of flame retardant additives in flexible polyurethane foams is in automotive applications. In most countries, the interior components of motor vehicles must meet flammability test MVSS-302 or its equivalent.

Known flame retardant additives are volatile or contain volatile components that tend to form an undesirable film on windows as the volatile components are released. This phenomenon is known as fogging.

Automobile and component manufacturers would like to eliminate or at least reduce as much as possible the use of volatile components in motor vehicles and particularly in vehicle interiors.

Notwithstanding the desire of reducing the use of halogens in the automobile industry, flame retardants that are currently used in flexible polyurethane foams typically contain halogens. In fact, tris(dichloropropyl) phosphate is the most commonly used flame retardant for automotive flexible polyurethane foam components. Unfortunately, to date, non-halogen additives are often found to be less efficient than halogenated flame retardants. The use of higher additive use levels of non-halogen additives to compensate for their lower efficiency, contributes to reduced foam physical properties and greater fogging, both of which are undesirable if not unacceptable.

Historically, the first commercially available triaryl phosphates were derived from coal tar and included tricresyl phosphate, trixylyl phosphate, and mixtures of triaryl phosphates. Isopropylated and butylated synthetic triaryl phosphates were later developed as direct substitutes for coal tar derivatives and were mainly used as plasticizers for polyvinylchloride (PVC) compositions. During the development of flame retardant applications, the trend for newer additives was toward higher performance through increased phosphorus content and lower viscosity.

Alkylated triaryl phosphate esters have been used as flame retardants for flexible polyurethane foam for many years. These esters combine good hydrolytic and thermal stability with flame retardant efficiency provided by their phosphorus content. Triaryl phosphate esters are used either by themselves, or more commonly, in conjunction with halogenated additives. U.S. Pat. No. 4,746,682 describes blending alkylated triaryl phosphate ester with brominated diphenyl oxide for use as a flame retardant for polyurethane. The use of isopropylated phosphate esters is referenced in U.S. Pat. No. 4,565,833. These esters contain varying levels of triphenyl phosphate (TPP). The use of triphenyl phosphate has hereto been desirable because it reduced viscosity and contributed higher phosphorus content. Phosphorus is known to contribute to performance as a flame retardant.

Alkylated triphenyl phosphates that have been recommended and used as flame retardants have had phosphorus contents in excess of 7.7 percent. Available butylated phosphates recommended for use as flame retardants have a phosphorus content of at least 8 percent (AKZO-Nobel Functional Chemicals Bulletin 99-94, 1999).

According to the present invention, it has been unexpectedly discovered that higher alkylated triaryl phosphates, having lower phosphorus content, offer superior flame retardant performance in flexible polyurethane foam, combining improved efficiency with a lower propensity to fog.

DISCLOSURE OF THE INVENTION

According to various features, characteristics and embodiments of the present invention which will become apparent as the description thereof proceeds, the present invention provides a method for imparting flame retardant properties to polymer compositions which involves adding to a polymer composition a mixture comprising triaryl phosphate esters represented by the following formula:

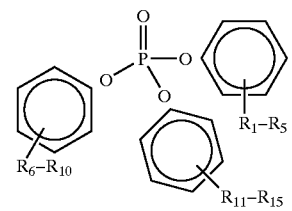

where $R_1$–$R_{15}$ can independently be located in the ortho, meta or para positions on their respective phenol rings and are, independently, H or branched or linear alkyl groups having 3 to 11 carbon atoms and the mole ratio of the alkylate to phenol in the mixture is at least 0.77, preferably greater than 0.81 and most preferably greater than 0.85

The polymer composition can be any type of polymer composition used to produce synthetic polymers such as thermoplastic polymers including polyurethanes, and can include any other conventional additives and reactants such as catalysts, surfactants, cross linkers, dyes, fillers, etc.

The higher alkylated mixtures of triaryl phosphate ester can be used alone or in combination with other flame retardants including halogenated flame retardants such as brominated and/or chlorinated flame retardants. The higher alkylated mixtures of triaryl phosphate esters can incorporate therein any of the additives and reactants discussed herein, including the other flame retardants.

The present invention further provides a flame retardant polymer composition for producing a foamed article which includes a polyisocyanate, a polyol and the higher alkylated mixtures of triaryl phosphate esters discussed above.

The higher alkylated mixtures of triaryl phosphate esters can be incorporated into the composition alone or added premixed with one of the polyisocyanate or polyol or with one or more of other conventional additives and/or reactants such as catalysts, surfactants, cross linkers, dyes, fillers, additional flame retardants, etc.

The present invention also provides a flame retardant article comprising the reaction product of a polyisocyanate and a polyol with the higher alkylated mixtures of triaryl phosphate esters discussed above incorporated therein.

BEST MODE FOR CARRYING OUT THE INVENTION

According to the present invention, flame retardancy is imparted to polyurethane compositions by incorporating therein higher alkylated mixtures of triaryl phosphate esters having higher alkylation levels at 0.5 to 50.0 php (parts per hundred polyol). Higher alkylated mixtures of triaryl phosphate esters according to the present invention are those having triaryl phosphate esters which, on the average, have more alkyl substitution and/or lower triphenyl phosphate content than triaryl phosphates heretofore recommended and used as flame retardants.

The higher alkylated mixtures of triaryl phosphate esters of the present invention are more viscous and lower in phosphorus content than conventional triaryl phosphate flame retardants. Due to their viscosities, the higher alkylated triaryl phosphate esters used according to the present invention have been developed and used as functional fluids such as hydraulic fluids, but have not been used or recognized for use as flame retardants in polyurethane compositions.

Higher alkylated mixtures of triaryl phosphate esters of the present invention are provided as mixtures of triaryl phosphate esters that are represented by the following formula:

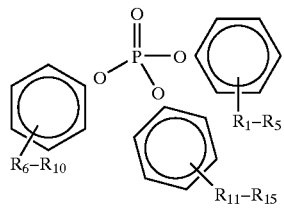

where $R_1$–$R_{15}$ are, independently, H or branched or linear alkyl groups having 3 to 11 carbon atoms and the mole ratio of the alkylate to phenol in the mixtures is at least 0.77.

During the course of the present invention it was discovered that alkylated triaryl phosphate esters having higher alkylation levels provide better flame retardant efficiency in flexible polyurethane foam compositions than alkylated triaryl phosphate esters heretofore used. This finding is unexpected since the phosphorus levels of esters having higher alkylation levels are lower than those of alkylated phosphate esters that are conventionally used as flame retardant additives.

The higher alkylated mixtures of triaryl phosphate esters of the present invention can be incorporated into polyurethane compositions alone or in combination with conventional halogenated flame retardants. The use of the higher alkylated mixtures of triaryl phosphate esters of the present invention together with halogen containing flame retardants results in unexpected advantages that are analogous to those associated with the use of the higher alkylated mixtures of triaryl phosphate esters alone. Although the higher alkylated mixtures of triaryl phosphate esters of the present invention have a lower phosphorus content than conventional triaryl phosphates, polyurethanes containing blends of the higher alkylated mixtures of triaryl phosphate esters and halogen flame retardants exhibit better flammability test performance than blends of conventional lower alkylated triaryl phosphates and halogenated flame retardants.

The higher alkylated mixtures of triaryl phosphate esters of the present invention may be used alone or in combination with one or more conventional halogenated flame retardant.

Preferred halogenated flame retardants for use in conjunction with the higher alkylated mixtures of triaryl phosphate esters according to the present invention include brominated flame retardants such as ring brominated benzoate compounds exemplified in U.S. Pat. No. 5,728,760, ring brominated phthalates, brominated diphenyl oxides, brominated diphenyl alkanes, tribromoneopentyl alcohol, dibromoneopentyl glycol, and hexabromocyclododecane. Chlorinated flame retardants that can be used in combination with the higher alkylated mixtures of triaryl phosphate esters according to the present invention include chlorinated phosphate esters, chlorinated diphosphate esters, PVC powder, and chlorinated paraffins. Examples of chlorinated phosphate esters include tris(monochloropropyl) phosphate and tris(dichloropropyl)phosphate.

The higher alkylated mixtures of triaryl phosphate esters of the present invention can be used in combination with halogenated flame retardants at ratios within a range of from about one part by weight of the higher alkylated mixtures of triaryl phosphate esters to between about 0.2 and about 4 parts by weight of the halogenated flame retardant(s). A more preferred range is about one part by weight of the higher alkylated mixtures of triaryl phosphate esters to between about one and about three parts by weight of the halogenated flame retardant(s).

Polyurethane compositions having improved flame retardancy according to the present invention can be produced by incorporating therein about 0.5 to about 50.0 php of the higher alkylated mixtures of triaryl phosphate esters or about 0.35 to about 35.0 php of a blend of the higher alkylated mixtures of triaryl phosphate esters and halogenated flame retardant(s).

Polyurethanes are prepared by reacting isocyanates with alcohols. Other conventional additives can be included such as other catalysts, surfactants, cross linkers, dyes, fillers, etc. Methods of polyurethane production are well known. The higher alkylated mixtures of triaryl phosphate esters of the present invention can be added to the reaction mixture at the time of reaction or can be pre-blended with one or more of the reactants or additives.

The higher alkylated mixtures of triaryl phosphate esters of the present invention can be used in conjunction with other conventional additives such as catalysts, surfactants, cross linkers, dyes, fillers, etc.

The higher alkylated mixtures of triaryl phosphate esters of the present invention are particularly useful in flexible polyurethane foams.

In the following illustrative examples, tests were conducted to determine the flame retardant characteristics of the higher alkylated mixtures of triaryl phosphate esters and to evaluate their ability to reduce fogging

EXAMPLE 1

Preparation of Isopropylated Triaryl Phosphate Esters

In this Example isopropylated triaryl phosphate ester samples having different levels of alkylation were prepared for testing. The phosphate ester samples were prepared by combining different ratios of propylene and phenol to make alkylated phenols which were subsequently subjected to phosphorylation. The preparation essentially followed the procedure exemplified in example 4 of U.S. Pat. No. 3,576,923. The phosphate ester samples are listed in Table 1 below.

TABLE 1

| Phosphate Ester Sample | Weight Ratio Propylene:phenol | Mole Ratio Propylene:Phenol | Percent Triphenyl Phosphate | Percent Phosphorus |
|---|---|---|---|---|
| A | 9:91 | 0.22 | 38 | 8.6 |
| B | 13:87 | 0.33 | 29 | 8.4 |
| C | 21:79 | 0.59 | 20 | 8.3 |
| D | 27:73 | 0.82 | 6 | 7.5 |
| E | 36:64 | 1.26 | 3 | 7.3 |

EXAMPLE 2

Preparation of Foam Samples

In this Example, foam samples incorporating the phosphate ester samples of Example 1 were prepared in order to evaluate flame retardant properties and fogging characteristics.

The foam samples were prepared by mixing the polyol and phosphate ester samples together. The remaining components of the formulations, except for the isocyanate, were added and stirred into the polyol/phosphate ester mixture. The isocyanate was the last component added and stirred into the mixture.

The reaction mixture was poured into a box and allowed to expand fully. The box containing expanded foam was placed in a ventilated 110° C. oven for 30 minutes to accelerate curing. Foam samples were removed from their boxes and stored under ambient conditions for at least twenty four hours prior to testing.

The formulations of the foam samples tested included the phosphate ester samples from Example 1 in amounts of 6, 7 and 8 parts by weight together with 4 and 5 parts by weight of tris(dichloropropyl) phosphate, tolylene diisocyanate (TDI) at an index of 110 and the following reactants:

| | |
|---|---|
| 56 OH Polyether Polyol | 100 parts by weight |
| Water | 3.3 parts by weight |
| Amine Catalyst | 0.5 parts by weight |
| Silicone Surfactant | 1 parts by weight |
| Tin Catalyst | 0.53 parts by weight |

Table 2 shows properties of foam samples that produced acceptable SE flammable ratings with the lowest phosphate content. All foam samples had similar densities and porosities of around 2 scfm air flow.

TABLE 2

| Phosphate Ester Sample | Parts Per Hundred Polyol (php) | Density (lb/ft³) |
|---|---|---|
| A | 7 | 1.8 |
| B | 7 | 1.8 |
| C | 7 | 1.8 |
| D | 6 | 1.8 |
| E | 6 | 1.8 |

EXAMPLE 3

Evaluation of Foam Samples

In this Example, the foam samples from Example 2 were tested for flammability and fogging using standardized procedures, including FMVSS-302 for flammability and DIN 75201 for fogging.

The fogging tests included tris (dichloropropyl) phosphate (TDCP) as a comparison. TDCP was observed to give an SE rating at 4 php in foams using the same formulation having similar density and porosity. Results of the DIN 75102 test are given by weight. Less than 1 mg volatiles is a current requirement.

The results of the flammability and fogging tests are presenting in Table 3 below.

TABLE 3

| Phosphate Ester Sample | php | MVSS-302 Rating | DIN 75 102 Fogging (mg) |
|---|---|---|---|
| A | 7 | SE* | 0.87 |
| B | 7 | SE | Not Tested |
| C | 7 | SE | Not Tested |
| D | 6 | SE | 0.80 |
| E | 6 | SE | Not Tested |
| TDCP | 4 | SE | 1.40 |

*SE = Indicates that during the flame test, the flame self-extinguished before the 1.5 inch gage mark.

EXAMPLE 4

Preparation of Butylated Triaryl Phosphate Esters

In this Example butylated triaryl phosphate ester samples having different levels of alkylation were prepared for testing. The phosphate ester samples were prepared by combining different ratios of butylene and phenol to make alkylated phenols which were subsequently subjected to phosphorylation. The preparation essentially followed the procedures exemplified in example 1 of U.S. Pat. No. 3,576,923. The phosphate ester samples are listed in Table 4 below.

TABLE 4

| Phosphate Ester Sample | Weight Ratio Butylene:phenol | Mole Ratio Butylene:Phenol | Percent Phosphorus |
|---|---|---|---|
| F | 16.5:83.5 | 0.35 | 8.0 |
| G | 31.5:78.5 | 0.77 | 6.6 |

EXAMPLE 5

Preparation of Foam Samples

In this Example, foam samples incorporating the phosphate ester samples of Example 4 were prepared according to the procedure set forth in Example 2 above.

The formulations of the foam samples included TDI at an index of 110 together with the following reactants:

| | |
|---|---|
| 56 OH Polyether Polyol | 100 parts by weight |
| Phosphate Esters | 16 parts by weight |
| Water | 4.4 parts by weight |
| Amine Catalyst | 0.5 parts by weight |
| Silicone Surfactant | 1 parts by weight |
| Tin Catalyst | 0.56 parts by weight |

Table 5 shows properties of foam samples both of which had similar densities and porosities of around 2 scfm air flow.

TABLE 5

| Phosphate Ester Sample | Parts Per Hundred Polyol (php) | Density (lb/ft³) |
|---|---|---|
| F | 16 | 1.5 |
| G | 16 | 1.5 |

EXAMPLE 6

Evaluation of Foam Samples

In this Example, the foam samples from Example 5 were tested for flammability using the standardized procedures set forth in FMVSS-302 for flammability.

The results of the flammability tests are presenting in Table 6 below.

TABLE 6

| Phosphate Ester Sample | php | MVSS-302 Rating |
|---|---|---|
| F | 16 | SE/NBR** |
| G | 16 | SE |

ES/NBR** = Indicates that during the flame test, the flame self-extinguished after burning beyond the 1.5 inch gage mark.

It is observed that the more highly alkylated phosphate ester sample, G, provides better flammability performance than phosphate ester sample F, which is unable to provide an SE rating at 16 php. From this, it can be concluded that in flexible polyurethane foam, higher levels of butylation result in triaryl phosphate esters with better performance in flammability testing.

EXAMPLE 7

Evaluation of Blends of the Phosphates of Example 1 and Halogenated Flame Retardants in Flexible Polyurethane In this Example, blends comprising 60 parts by weight of a halogenated flame retardant and 40 parts of phosphate ester samples of example 1 were prepared. The halogenated flame retardant was a commercially available mixture of ring brominated ethyl hexyl benzoate and phthalate containing approximately 54 percent bromine.

Foam samples incorporating the blends were prepared as according to the procedure set forth in Example 2 above.

The formulations of the foam samples included the blends in amounts of 12, 14 and 16 parts by weight together and TDI at an index of 110 together with the following reactants:

| | |
|---|---|
| 56 OH Polyether Polyol | 100 parts by weight |
| Water | 4.4 parts by weight |
| Amine Catalyst | 0.48 parts by weight |
| Silicone Surfactant | 1 parts by weight |
| Tin Catalyst | 0.55 parts by weight |

Table 7 shows properties of foam samples that included the blends as indicated. All foam samples had similar densities and porosities of around 2 scfm air flow.

TABLE 7

| Phosphate Ester Sample in Blend | Parts Per Hundred Polyol (php) | Density (lb/ft³) |
|---|---|---|
| A | 14 | 1.52 |
| C | 14 | 1.51 |
| D | 14 | 1.52 |
| E | 14 | 1.52 |

EXAMPLE 8

Evaluation of Foam Samples

In this Example, the foam samples from Example 7 were tested for flammability and fogging using standardized procedures, including FMVSS-302 for flammability and DIN 75201 for fogging.

The fogging tests included TDCP blended with the halogenated flame retardant as a comparison. The TDCP blend was observed to give an SE rating at 12 php in foams using the same formulation having similar density and porosity. Results of the DIN 75102 test are given by weight. Less than 1 mg volatiles is a current requirement.

The results of the flammability and fogging tests are presented in Table 8 below.

TABLE 8

| Phosphate Ester Sample in Blend | php | MVSS-302 Rating | DIN 75 102 Fogging |
|---|---|---|---|
| A | 14 | SE/NBR | 0.94 mg |
| C | 14 | SE/NBR | 0.78 mg |
| D | 14 | SE | 0.95 mg |
| E | 14 | SE | 0.75 mg |
| TDCP | 12 | SE | 1.40 mg |

Table 8 shows results of testing of foams containing the phosphate ester/halogenated flame retardant blends. Foams containing more highly alkylated triaryl phosphate performed better in flammability testing. Blends containing phosphate samples A or C achieved only an SE/NBR rating at 14 php. These foams burned farther under the controlled test conditions of MVSS-302 than foams containing higher alkylated phosphate samples D and E.

Table 8 also includes fogging data for the foam samples. TDCP meets SE criteria in foams of this formulation at 12 php. However, even when tested at 10 php, TDCP fogging exceeds acceptable limits.

As indicated above, the higher alkylated mixtures of triaryl phosphate esters of the present invention can include branched or linear alkyl groups having 3 to 11 carbon atoms that occupy any position on the corresponding phenol ring. The higher alkylated triaryl phosphate esters of the present invention can be used alone or in combination with other conventional flame retardants in polymer compositions, and particularly polymer compositions that are used to produced foam articles such as thermoset polymer compositions, including polyurethanes.

The higher alkylated mixtures of triaryl phosphate esters of the present invention can be provided together with one or more polymer reactant(s) or additive(s) as a premixed composition.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A method for imparting flame retardant properties to a polymer composition which comprises:
providing a polyurethane polymer composition and
adding to the polyurethane polymer composition in absence of any complex salt, a mixture comprising triaryl phosphate esters represented by the following formula:

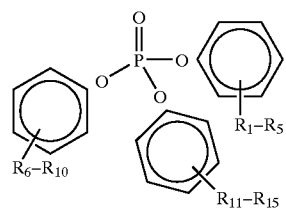

where $R_1$–$R_{15}$ can independently be located in the ortho, meta or para positions on their respective phenol rings and are, independently, H or branched or linear alkyl groups having 3 to 11 carbon atoms and the mole ratio of the alkylate to phenol in the mixture is at least about 0.77.

2. The method for imparting flame retardant properties to a polymer composition according to claim 1, wherein at least one of $R_1$–$R_{15}$ are propyl or butyl groups.

3. The method for imparting flame retardant properties to a polymer composition according to claim 1, wherein the mixture comprising the triaryl phosphate esters is incorporated in the polymer composition in an amount of from about 0.5 to about 50.0 parts per hundred parts polyol by weight.

4. The method for imparting flame retardant properties to a polymer composition according to claim 1, wherein the mixture comprising the triaryl phosphate esters is incorporated in the polymer composition together with at least one additional flame retardant.

5. The method for imparting flame retardant properties to a polymer composition according to claim 4, wherein the at least one additional flame retardant comprises a halogenated flame retardant.

6. The method for imparting flame retardant properties to a polymer composition according to claim 5, wherein the halogenated flame retardant comprises a brominated or chlorinated component.

7. The method for imparting flame retardant properties to a polymer composition according to claim 4, wherein the ratio of the mixture comprising the triaryl phosphate esters to the at least one additional flame retardant is in the range of about 1:0.2 to about 1:4 parts by weight.

8. The method for imparting flame retardant properties to a polymer composition according to claim 7, wherein the combined amount of the mixture comprising the triaryl phosphate esters and the at least one additional flame retardant incorporated in the polymer composition is between about 0.35 to about 35.0 parts per hundred parts polyol by weight.

9. The method for imparting flame retardant properties to a polymer composition according to claim 1, wherein the polymer composition includes at least one component selected from the group consisting of catalysts, surfactants, cross linkers, dyes, fillers and combination thereof.

10. A flame retardant polymer composition for producing a foamed article which comprises:
a polyisocyanate;
a polyol; and
a mixture comprising triaryl phosphate esters represented by the following formula:

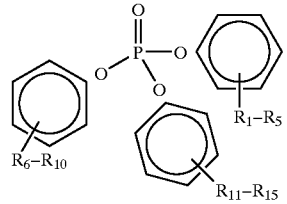

where $R_1$–$R_{15}$ can independently be located in the ortho, meta or para positions on their respective phenol rings and are, independently, H or branched or linear alkyl groups having 3 to 11 carbon atoms and the mole ratio of the alkylate to phenol in the mixture is at least about 0.77, provided that there is no complex salt present.

11. A flame retardant polymer composition according to claim 10, wherein at least one of $R_1$–$R_{15}$ are propyl or butyl groups.

12. A flame retardant polymer composition according to claim 10, wherein the mixture comprising the triaryl phosphate esters is incorporated in the polymer composition in an amount of from about 0.5 to about 50.0 parts per hundred parts polyol by weight.

13. A flame retardant polymer composition according to claim 10, wherein the mixture comprising the triaryl phosphate esters is incorporated in the polymer composition together with at least one additional flame retardant.

14. A flame retardant polymer composition according to claim 13, wherein the at least one additional flame retardant comprises a halogenated flame retardant.

15. A flame retardant polymer composition according to claim 14, wherein the halogenated flame retardant comprises a brominated or chlorinated component.

16. A flame retardant polymer composition according to claim 13, wherein the ratio of the mixture comprising the triaryl phosphate esters to the at least one additional flame retardant is in the range of about 1:0.2 to about 1:4 parts by weight.

17. A flame retardant polymer composition according to claim 16, wherein the combined amount of the mixture comprising the triaryl phosphate esters and the at least one additional flame retardant incorporated in the polymer composition is between about 0.35 to about 35.0 parts per hundred parts polyol by weight.

18. A flame retardant polymer composition according to claim 17, further comprises at least one component selected from the group consisting of catalysts, surfactants, cross linkers, dyes, fillers and combination thereof.

19. A flame retardant polymer composition according to claim 18, wherein the mixture comprising the triaryl phosphate esters is premixed with at least one of the other components of the polymer composition.

20. A flame retardant polymer composition according to claim 10, wherein the mixture comprising the triaryl phosphate esters is premixed with at least one of the other components of the polymer composition.

21. A flame retardant article comprising the reaction product of a polyisocyanate and a polyol; and
a mixture comprising triaryl phosphate esters incorporated in the reaction produce, the triaryl phosphate esters of the mixture represented by the following formula:

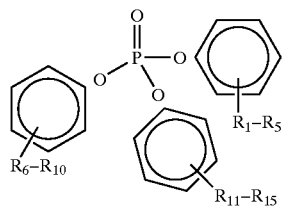

where $R_1$–$R_{15}$ can independently be located in the ortho, meta or para positions on their respective phenol rings and are, independently, H or branched or linear alkyl groups having 3 to 11 carbon atoms and the mole ratio of the alkylate to phenol in the mixture is at least about 0.77, provided that there is no complex salt present in the reaction.

22. A flame retardant article according to claim 21, wherein at least one of $R_1$–$R_{15}$ are propyl or butyl groups.

23. A flame retardant article according to claim 21, wherein the mixture comprising the triaryl phosphate esters is incorporated in the reaction product in an amount of from about 0.5 to about 50.0 parts per hundred parts polyol by weight.

24. A flame retardant article according to claim 21, wherein the mixture comprising the triaryl phosphate esters is incorporated in the reaction product together with at least one additional flame retardant.

25. A flame retardant article according to claim 24, wherein the at least one additional flame retardant comprises a halogenated flame retardant.

26. A flame retardant article according to claim 25, wherein the halogenated flame retardant comprises a brominated or chlorinated component.

27. A flame retardant article according to claim 24, wherein the ratio of the mixture comprising the triaryl phosphate esters to the at least one additional flame retardant is in the range of about 1:0.2 to about 1:4 parts by weight.

28. A flame retardant article according to claim 27, wherein the combined amount of the mixture comprising the triaryl phosphate esters and the at least one additional flame retardant incorporated in the article is between about 0.35 to about 35.0 parts per hundred parts polyol by weight.

* * * * *